United States Patent
Israel et al.

(10) Patent No.: US 9,390,078 B2
(45) Date of Patent: Jul. 12, 2016

(54) COMPUTER-IMPLEMENTED SYSTEMS AND METHODS FOR DETECTING PUNCTUATION ERRORS

(71) Applicant: Educational Testing Service, Princeton, NJ (US)

(72) Inventors: Ross Israel, Bloomington, IN (US); Joel Tetreault, Lawrenceville, NJ (US); Martin Chodorow, New York, NY (US)

(73) Assignee: Educational Testing Service, Princeton, NJ (US)

( * ) Notice: Subject to any disclaimer, the term of this patent is extended or adjusted under 35 U.S.C. 154(b) by 373 days.

(21) Appl. No.: 13/735,214

(22) Filed: Jan. 7, 2013

(65) Prior Publication Data

US 2013/0179153 A1 Jul. 11, 2013

Related U.S. Application Data

(60) Provisional application No. 61/583,442, filed on Jan. 5, 2012.

(51) Int. Cl.
*G06F 17/27* (2006.01)
*G06F 17/24* (2006.01)

(52) U.S. Cl.
CPC .............. *G06F 17/24* (2013.01); *G06F 17/273* (2013.01)

(58) Field of Classification Search
USPC ...................................................... 704/7–10
See application file for complete search history.

(56) References Cited

U.S. PATENT DOCUMENTS

| | | | | |
|---|---|---|---|---|
| 6,067,514 | A * | 5/2000 | Chen | 704/235 |
| 7,010,489 | B1 * | 3/2006 | Lewis et al. | 704/260 |
| 7,580,838 | B2 * | 8/2009 | Divay et al. | 704/257 |
| 8,355,904 | B2 * | 1/2013 | Lee | 704/9 |
| 2004/0138881 | A1 * | 7/2004 | Divay et al. | 704/231 |
| 2006/0136474 | A1 * | 6/2006 | Chang et al. | 707/102 |
| 2007/0239433 | A1 * | 10/2007 | Chaski | 704/9 |
| 2009/0281791 | A1 * | 11/2009 | Li | 704/9 |
| 2011/0087484 | A1 * | 4/2011 | Lee | 704/9 |
| 2012/0304056 | A1 * | 11/2012 | Detlef et al. | 715/256 |

OTHER PUBLICATIONS

Alegria, Inaki, Arrieta, Bertol, Diaz De Ilarraza, Arantza, Izagirre, Eli, Maritxalar, Montse; Using Machine Learning Techniques to Build a Comma Checker for Basque; Proceedings of the COLING/ACL Main Conference Poster Sessions, COLING-ACL '06; Association for Computational Linguistics; 2006.

Baldwin, Timothy, Joseph, Manuel; Restoring Punctuation and Casing in English Text; Australasian Conference on Artificial Intelligence '09; pp. 547-556; 2009.

Brill, Eric; A Corpus-Based Approach to Language Learning; Ph.D. Thesis, The University of Pennsylvania; 1993.

(Continued)

*Primary Examiner* — Leonard Saint Cyr
(74) *Attorney, Agent, or Firm* — Jones Day

(57) ABSTRACT

Systems and methods are provided for detecting punctuation errors in a text including one or more sentences. A sentence including a plurality of words is received, the sentence including one or more preexisting punctuation marks. One or more punctuation marks are determined with a statistical classifier based on a set of rules, to be inserted in the sentence. The determined punctuation marks are compared with the preexisting punctuation marks. A report of punctuation errors is output based on the comparison.

20 Claims, 5 Drawing Sheets

(56) References Cited

OTHER PUBLICATIONS

Briscoe, Ted, Carroll, John; Developing and Evaluating a Probabilistic LR Parser of Part-of-Speech and Punctuation Labels; Proceedings of the ACL/SIGPARSE 4th International Workshop on Parsing Technologies; Prague, Czech Republic; 1995.

Cohen, Jacob; A Coefficient of Agreement for Nominal Scales; Educational and Psychological Measurement, 20(1); pp. 37-46; 1960.

Connors, Robert; Lunsford, Andrea; Frequency of Formal Errors in Current College Writing, or Ma and Pa Kettle Do Research; College Composition and Communication, 39(4); pp. 395-409; 1988.

Dahlmeier, Daniel, Ng, Hwee Tou; Grammatical Error Correction with Alternating Structure Optimization; Proceedings of the 49th Annual Meeting of the Association for Computational Linguistics: Human Language Technologies—vol. 1, HLT '11; pp. 915-923; 2011.

Dale, Robert, Kilgarriff, Adam; Helping Our Own: Text Massaging for Computational Linguistics as a New Shared Task; International Conference on Natural Language Generation; 2010.

De Felice, Rachele, Pulman, Stephen; A Classifier-Based Approach to Preposition and Determiner Error Correction in L2 English; Proceedings of COLING-08; pp. 169-176; 2008.

Dickinson, Markus, Israel, Ross, Lee, Sun-Hee; Developing Methodology for Korean Particle Error Detection; Proceedings of the 6th Workshop on Innovative Use of NLP for Building Educational Applications; Portland, OR; pp. 81-86; 2011.

Doran, Christine; Incorporating Punctuation into the Sentence Grammar: A Lexicalized Tree-Adjoining Grammar Perspective; Ph.D. Thesis, University of Pennsylvania; 1998.

Favre, Benoit, Hakkani-Tur, Dilek, Shriberg, Elizabeth; Syntactically-Informed Models for Comma Prediction; Proceedings of the 2009 IEEE International Conference on Acoustics, Speech and Signal Processing, ICASSP '09; pp. 4697-4700; 2009.

Gamon, Michael; Using Mostly Native Data to Correct Errors in Learners' Writing: A Meta-Classifier Approach; Human Language Technologies: The 2010 Annual Conference of the North American Chapter of the Association for Computational Linguistics; pp. 163-171; 2010.

Gamon, Michael; High-Order Sequence Modeling for Language Learner Error Detection; Proceedings of the 6th Workshop on Innovative Use of NLP for Building Educational Applications; pp. 180-189; 2011.

Gravano, Agustin, Jansche, Martin, Bacchiani, Michiel; Restoration Punctuation and Capitalization in Transcribed Speech; Proceedings of the 2009 IEEE International Conference on Acoustics, Speech and Signal Processing, ICASSP '09; pp. 4741-4744; 2009.

Hardt, Daniel; Comma Checking in Danish; Corpus Linguistics; pp. 266-271; 2001.

Hill, Robin, Murray, Wayne; Commas and Spaces: The Point of Punctuation; 11th Annual CUNY Conference on Human Sentence Processing; 1998.

Huang, Jing, Zweig, Geoffrey; Maximum Entropy Model for Punctuation Annotation from Speech; Proceedings of ICSLP; pp. 917-920; 2002.

Jones, Bernard; Towards Testing the Syntax of Punctuation; Proceedings of the 34th Annual Meeting on Association for Computational Linguistics, ACL '96; pp. 363-365; 1996.

Jones, Bernard; Exploring the Role of Punctuation in Parsing Natural Text; Proceedings of the 15th Conference on Computational Linguistics—vol. 1, COLING '94; pp. 421-425; 1994.

Lafferty, John, McCallum, Andrew, Pereira, Fernando; Conditional Random Fields: Probabilistic Models for Segmenting and Labeling Sequence Data; Proceedings of the 18th International Conference on Machine Learning, ICML '01; pp. 282-289; 2001.

Leacock, Claudia, Chodorow, Martin, Gamon, Michael, Tetreault, Joel; Automated Grammatical Error Detection for Language Learners; Synthesis Lectures on Human Language Technologies; Morgan & Claypool Publishers; 2010.

Liu, Yang, Shriberg, Elizabeth, Stolcke, Andreas, Harper, Mary; Comparing HMM, Maximum Entropy, and Conditional Random Fields for Disfluency Detection; Proceedings of the European Conference on Speech Communication and Technology; 2005.

Lu, Wei, Ng, Hwee; Better Punctuation Prediction with Dynamic Conditional Random Fields; Proceedings of the 2010 Conference on Empirical Methods in Natural Language Processing, EMNLP '10; pp. 177-186; 2010.

Madnani, Nitin, Tetreault, Joel, Chodorow, Martin, Rozovskaya, Alla; They Can Help: Using Crowdsourcing to Improve the Evaluation of Grammatical Error Detection Systems; Proceedings of the 49th Annual ACL Conference; Portland, OR; 2011.

Moniz, Helena; Batista, Fernando, Meinedo, Hugo, Abad, Alberto, Trancoso, Isabel, Mata, Ana Isabel, Mamede, Nuno; Prosodically-Based Automatic Segmentation and Punctuation; Proceedings of the 5th International Conference on Speech Prosody; 2009.

Moschitti, Alessandro; Making Tree Kernels Practical for Natural Language Learning; Proceedings of EACL; pp. 113-120; 2006.

Nicholls, Diane; The Cambridge Learner Corpus; Cambridge University Press; pp. 572-581; 1999.

Oyama, Hiromi; Automatic Error Detection Method for Japanese Particles; Polyglossia, 18; pp. 55-63; 2010.

Ratnaparkhi, Adwait; A Maximum Entropy Model for Part-of-Speech Tagging; Proceedings of the Empirical Methods in Natural Language Processing, Eds. E. Brill & K. Church; pp. 133-142; 1996.

Rozovskaya, Alla, Sammons, Mark, Gioja, Joshua, Roth, Dan; University of Illinois System in Hoo Text Correction Shared Task; Proceedings of the Generation Challenges Session at the 13th European Workshop on Natural Language Generation; pp. 263-266; 2011.

Shieber, Stuart, Tao, Xiaopeng; Comma Restoration Using Constituency Information; Proceedings of the 2003 Human Language Technology Conference and Conference of the North American Chapter of the Association for Computational Linguistics; pp. 221-227; 2003.

Tetreault, Joel, Chodorow, Martin; The Ups and Downs of Preposition Error Detection in ESL Writing; Proceedings of COLING-08; 2008.

Tetreault, Joel, Foster, Jennifer, Chodorow, Martin; Using Parse Features for Preposition Selection and Error Detection; Proceedings of the ACL 2010 Conference Short Papers; pp. 353-358; 2010.

White, Michael, Rajkumar, Rajakrishnan; A More Precise Analysis of Punctuation for Broad Coverage Surface Realization with CCG; Proceedings of the Workshop on Grammar Engineering Across Frameworks, GEAF '08; pp. 17-24; 2008.

* cited by examiner

COMPUTER-IMPLEMENTED SYSTEMS AND METHODS FOR DETECTING PUNCTUATION ERRORS

CROSS-REFERENCE TO RELATED APPLICATIONS

This application claims the benefit of U.S. Provisional Patent Application No. 61/583,442 filed on Jan. 5, 2012, the entirety of which is incorporated herein by reference.

TECHNICAL FIELD

This document relates generally to natural language processing and more particularly to error correction in natural language processing.

BACKGROUND

Automatically detecting and correcting grammatical errors is a growing sub-field of Natural Language Processing. Written grammatical errors are often categorized to include errors in grammar, spelling, or usage. For example, punctuation errors are among the most common usage errors.

SUMMARY

Systems and methods are provided for detecting punctuation errors in a text including one or more sentences. A sentence including a plurality of words is received, the sentence including one or more preexisting punctuation marks. One or more punctuation marks are determined with a statistical classifier based on a set of rules, to be inserted in the sentence. The determined punctuation marks are compared with the preexisting punctuation marks. A report of punctuation errors is output based on the comparison.

As an example, a system of detecting punctuation errors in a text including one or more sentences includes one or more data processors and one or more computer-readable mediums in communication with the data processors encoded with instructions for commanding the data processors to execute the following steps: receiving a sentence including a plurality of words, the sentence including one or more preexisting punctuation marks, determining, with a statistical classifier based on a set of rules, one or more punctuation marks to be inserted in the sentence, comparing the determined punctuation marks with the preexisting punctuation marks, and outputting a report of punctuation errors based on the comparison.

As another example, a non-transitory computer-readable storage medium for detecting punctuation errors in a text including one or more sentences includes programming instructions for causing a processing system to perform the following steps: receiving a sentence including a plurality of words, the sentence including one or more preexisting punctuation marks, determining, with a statistical classifier based on a set of rules, one or more punctuation marks to be inserted in the sentence, comparing the determined punctuation marks with the preexisting punctuation marks, and outputting a report of punctuation errors based on the comparison.

DETAILED DESCRIPTION

Punctuation errors account for a significant proportion of usage errors among language learners. For example, punctuation errors, such as comma errors, are among the most common usage errors for both non-native English writers and native English writers. Automatic detection and correction of punctuation errors (e.g., comma errors) in written texts can be very useful in both learning and automatic assessment environments.

Figure 1:
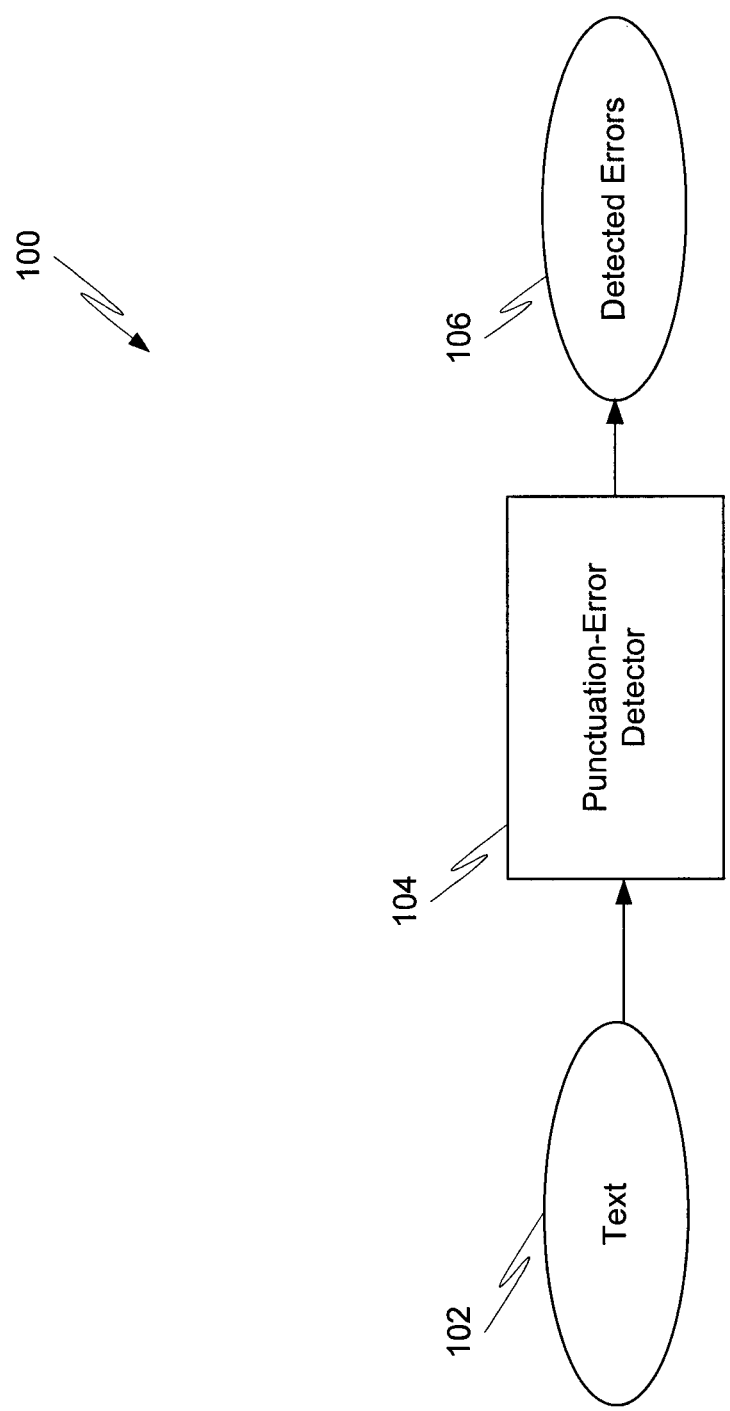
FIG. 1 depicts a computer-implemented system for detecting punctuation errors.

FIG. 1 depicts a computer-implemented system 100 for detecting punctuation errors. A punctuation-error detector 104 receives one or more written texts 102, detects (e.g., automatically) punctuation errors 106 in the written texts, and outputs a report of the punctuation errors 106.

Specifically, writers of the texts 102 may overuse or underuse punctuation marks, such as commas, in certain contexts. For example, the texts 102 may include a sentence "if you want to be a master you should know your subject well." The writer has not used the appropriate comma to separate the conditional clause "if you want to be a master" from the independent clause "you should know your subject well." A comma after the conditional clause can help readers to see where the conditional clause ends and where the independent clause begins. The punctuation-error detector 104 detects the comma usage error, and outputs a report of the comma usage error. As another example, the texts 102 may include a sentence "I suppose, that it is better to specialize in one specific subject." The comma after "suppose" is unnecessary in American English. The punctuation-error detector 104 may detect the error, and generate a report of the comma usage error.

Figure 2:
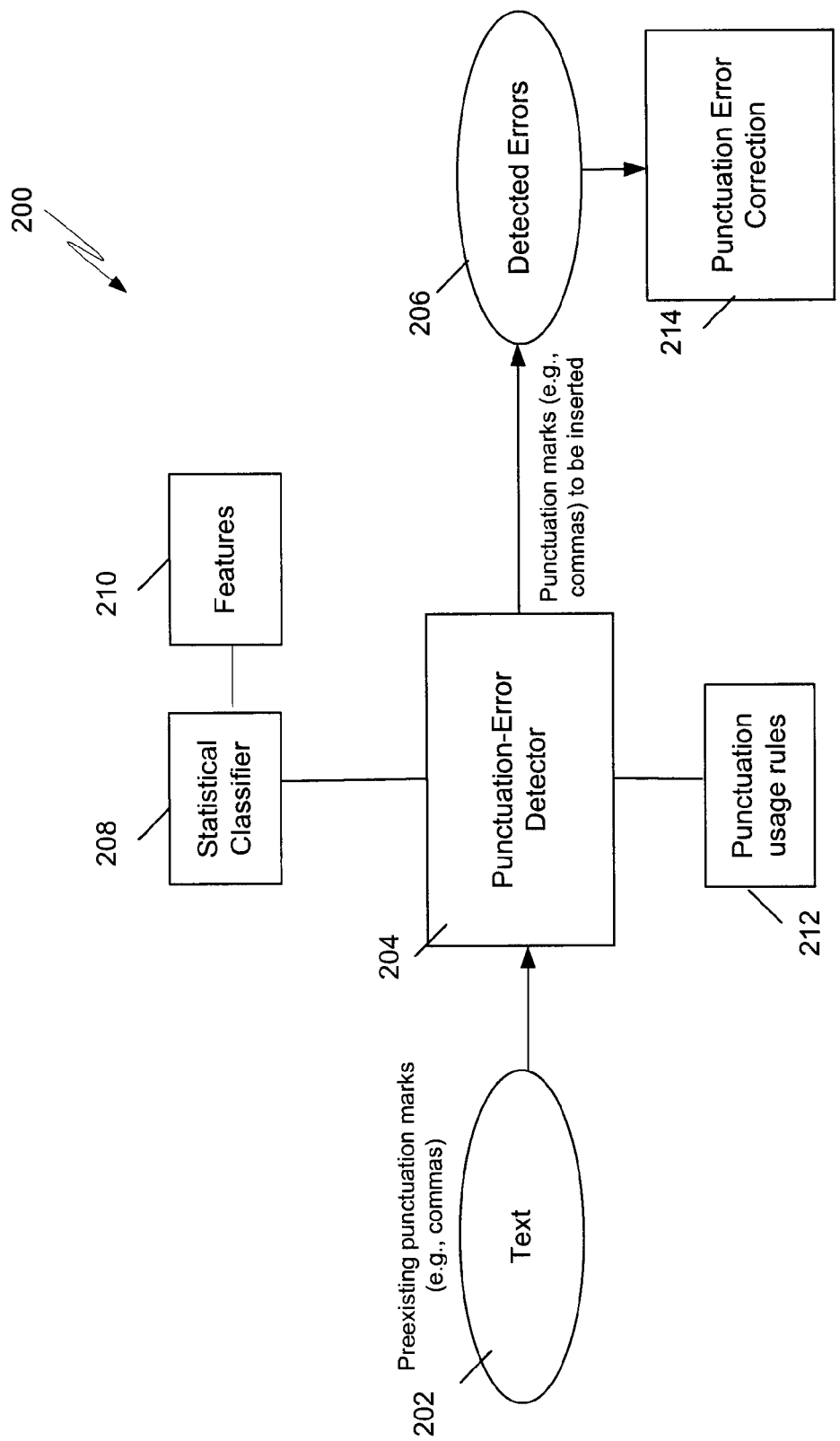
FIG. 2 shows an example of a punctuation-error detection system 200.

FIG. 2 shows an example of a punctuation-error detection system 200. A punctuation-error detector 204 implements a statistical classifier 208 and a predetermined set of features 210 for punctuation error detection. The punctuation-error detector 204 detects automatically punctuation errors 206 (e.g., comma errors) in one or more written texts 202 using the statistical classifier 208 and a list of punctuation usage rules 212 and outputs a report of the punctuation errors 206. A punctuation-error correction component 214 corrects the detected punctuation errors in the one or more written texts 202 based on the report.

Specifically, the one or more written texts 202 (e.g., newswire texts or student essays) contain a number of preexisting punctuation marks (e.g., commas). The punctuation-error detector 204 processes the one or more written texts 202, and determines where proper punctuation marks (e.g., commas) should be inserted in the one or more written texts 202, for example, regardless of the preexisting punctuation marks in the texts 202. Then the punctuation-error detector 204 compares the determined punctuation marks with the preexisting punctuation marks, and generates a report of punctuation errors 206. As an example, the punctuation-error detector 204 may be combined with the punctuation-error correction component 214 into a single component.

The statistical classifier 208 may be used with the list of punctuation usage rules 212 for error detection. For example, as shown in Table 1, the list of comma usage rules 212 is developed based on grammar rules, stylistic rules, or preferences.

TABLE 1

| Rule | Example |
| --- | --- |
| Elements in a List | Paul put the kettle on, Don fetched the teapot, and I made tea. |
| Initial Word/Phrase | Hopefully, this car will last for a while. |
| Dependent Clause | After I brushed the cat, I lint-rollered my clothes. |
| Independent Clause | I have finished painting, but he is still sanding the doors. |
| Parentheticals | My father, a jaded and bitter man, ate the muffin. |
| Quotations | "Why," I asked, "do you always forget to do it?" |
| Adjectives | She is a strong, healthy woman. |
| Conjunctive Adverbs | I would be happy, however, to volunteer for the Red Cross. |
| Contrasting Elements | He was merely ignorant, not stupid. |
| Numbers | 345,280,000 |
| Dates | She met her husband on Dec. 5, 2003. |
| Geographical Names | I lived in San Francisco, California, for 20 years. |
| Titles | Al Mooney, M. D., is a good doctor |
| Introducing Words | You may be required to bring many items, e.g., spoons, pans, and flashlights. |
| Other | Catch-all rule for any other comma use |

The statistical classifier 208 employs a statistical modeling method, such as conditional random fields (CRFs), for processing the written texts 202. For example, when CRFs are used by the statistical classifier 208, detection of comma usage errors is treated as a sequence labeling task. Each space between words is considered by the statistical classifier 208 to determine whether a comma is needed or not. A predetermined set of features 210 can be implemented with the statistical modeling method (e.g., CRFs). The features 210 may include lexical and syntactic features, as well as combination features and distance features. For example, considering a particular sentence "If the teacher easily gets mad, then the child will always fear going to school and class." A target insertion point of a comma is after the word "mad." Examples of the predetermined set of features 210 are shown in Table 2.

TABLE 2

| Feature(s) | Example(s) |
| --- | --- |
| Lexical and Syntactic Features | |
| unigram | easily, gets, mad, then, the |
| bigram | easily gets, gets mad, mad then, . . . |
| trigram | easily gets mad, gets mad then, . . . |
| pos uni | RB, VBZ, JJ, RB, DT |
| pos bi | RB VBZ, VBZ JJ, JJ RB, . . . |
| pos tri | RB VBZ JJ, VBZ JJ RB, . . . |
| combo | easily + RB, gets + VBZ, mad + JJ, . . . |
| first combo | If + RB |
| Distance Features | |
| bos dist | 5 |
| eos dist | 10 |
| prevCC dist | — |
| nextCC dist | 9 |

The example sentence may be processed using a sliding five-word window which includes a target word (e.g., "mad") and two words on either side of the target word, as shown in Table 2. The first six features include simple unigrams, bigrams, and trigrams of the words and part-of-speech (POS) tags for each of the words. The features "unigram," "bigram" and "trigram" are related to lexical items which each include a single word, a part of a word, or a chain of words that form the basic elements of a language's vocabulary. The POS-tag features "pos uni," "pos bi" and "pos tri," abstract away from the words and avoid the problem of data sparseness by allowing the statistical classifier 208 to focus on the categories of the words, rather than the lexical items in the example sentence. For example, the POS tag "RB" refers to an adverb, i.e., "easily" in the example sentence, and the POS tag "VBZ" refers to a verb, i.e., "gets" in the example sentence. In addition, the POS tag "JJ" refers to an adjective, i.e., "mad," and the POS tag "DT" refers to a determiner, i.e., "the" in the example sentence. The features related to the lexical items can help to encode any idiosyncratic relationships between words and commas that may not be exploited through the examination of more in-depth linguistic features (e.g., through the POS tags). For example, "then" is a special case of an adverb (RB) that is often preceded by a comma, even if other adverbs are not. So the POS tags alone may not capture this relationship. The features related to the lexical items may also provide an approximation of a language model or a hidden event language model approach, which is useful for comma restoration.

The combination feature, i.e., "combo," is a unigram of the word+POS for every word in the five-word sliding window. It reinforces the relationship between the lexical items and their corresponding POS tags, further strengthening the evidence of entries such as "then+RB." The feature "first combo" keeps track of a first combination feature (i.e., "if+RB") of the example sentence so that it can be referred to by the classifier 208 throughout processing the entire sentence. This feature is helpful when an introductory phrase is longer than the five-word window used by the classifier 208. In the example sentence, the introductory phrase "If the teacher easily gets mad" is so long that by the time the five-word window has moved to the target position of the space following "mad," the first word (i.e., "if") which indicates an introductory phrase, is beyond the scope of the five-word sliding window.

The four distance features are used to track the distances related to a target position or a target word. For example, the feature "bos dist" refers to the distance from the beginning of the sentence, and the feature "eos dist" refers to the distance to the end of the sentence. In addition, the feature "prevCC dist" indicates the distance from the previous coordinating conjunction, and the feature "nextCC dist" indicates the distance to the next coordinating conjunction. For example, these distance features help the classifier 208 by encoding measures for components of the example sentence that can affect the decision to insert a comma. These distance features are especially helpful over long range dependencies, when the information encoded by these features is far outside the scope of the five-word window the classifier 208 uses. The distance to the beginning of the sentence helps to encode the introductory words or phrases, which make up the bulk of the commas used in essays by learners of English. The distance to the end of the sentence can let the classifier 208 know the likelihood of a phrase beginning or ending at a certain point in the example sentence. The distances to and from the nearest coordinating conjunction are useful because many commas are collocated with coordinating conjunctions.

The one or more written texts 202 may be preprocessed to remove errors (e.g., spelling errors) other than punctuation errors to improve the speed and accuracy of punctuation error correction. In addition, the punctuation-error detector 204 may be trained or evaluated using annotated essays. For example, a number of test essays may be selected for annotation. Each comma in a test essay is marked as rejected or accepted by one or more annotators. Additionally, any space between words can be treated as an insertion point for a missing comma. The annotators also marked all accepted and inserted commas as either required or optional. Finally, the annotation also includes appropriate comma usage rules, such as those shown in Table 1.

Further, post-processing filters may be used in the punctuation-error correction component 214. For example, a post-processing filter may require that the classifier 208 be completely confident (e.g., 100% confidence) before the punctuation-error correction component 214 makes a change to a preexisting punctuation mark (e.g., a comma), when a large portion (e.g., 85%) of preexisting punctuation marks in the written texts 202 are expected to be correct. Another post-processing filter may require that the classifier 208 be at least 90% confident before the punctuation-error correction component 214 inserts a new punctuation mark (e.g., a new comma) into the texts 202. Or a filter may be implemented to prevent a punctuation mark (e.g., a comma) from being inserted before a particular word or phrase (e.g., "because").

Figure 3:
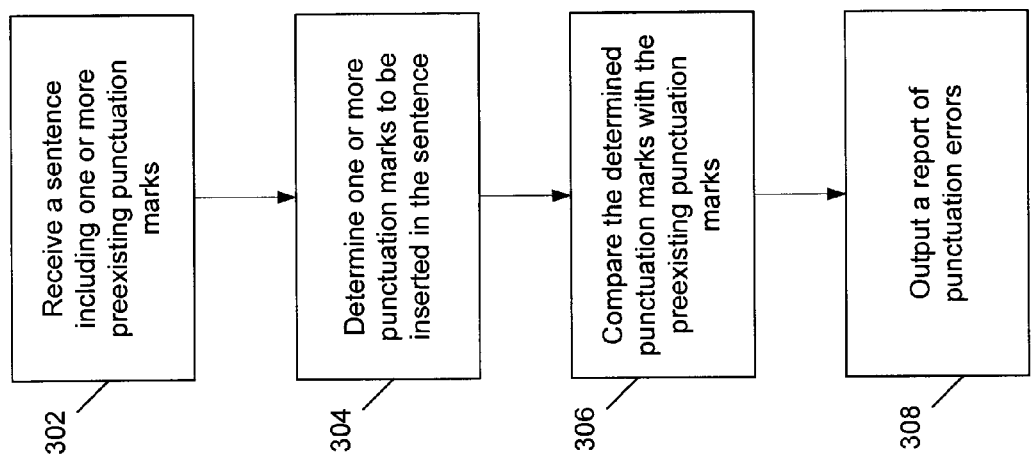
FIG. 3 shows an example of a flow chart for detecting punctuation errors.

FIG. 3 shows an example of a flow chart for detecting punctuation errors. A sentence in a text is received at 302. The sentence includes one or more preexisting punctuation marks. At 304, one or more punctuation marks are determined to be inserted in the sentence with a statistical classifier based on a set of rules. The determined punctuation marks are compared with the preexisting punctuation marks at 306. A report of punctuation errors is output based on the comparison at 308.

Figure 4:
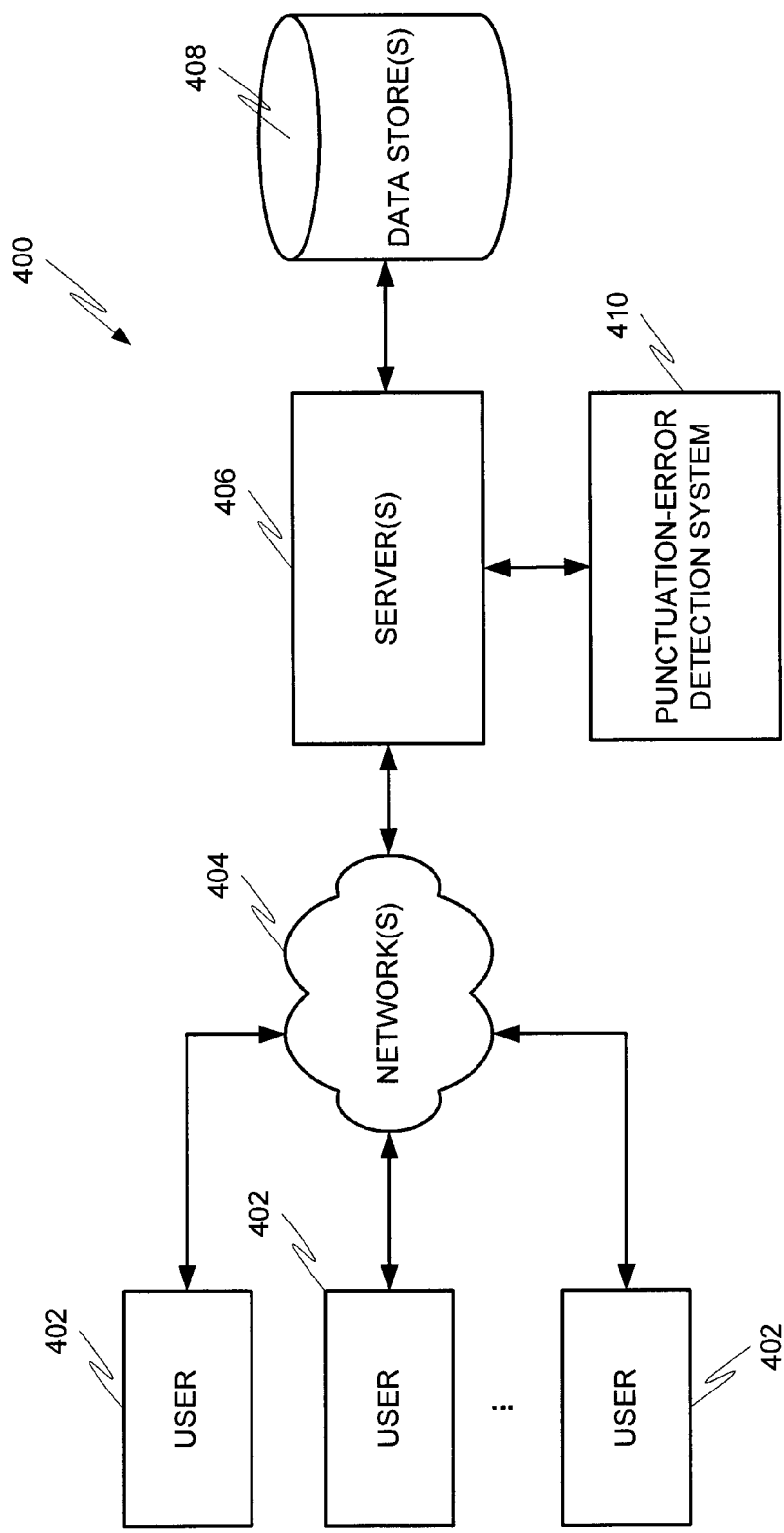
FIG. 4 illustrates an example of a computer-implemented environment for detecting punctuation errors.

FIG. 4 illustrates an example of a computer-implemented environment for detecting punctuation errors. As shown in FIG. 4, the users 402 can interact with a punctuation-error detection system 410 through a number of ways, such as over one or more networks 404. One or more servers 406 accessible through the network(s) 404 can host punctuation-error detection system 410. The one or more servers 406 can also contain or have access to one or more data stores 408 for storing data for the punctuation-error detection system 410.

Figure 5:
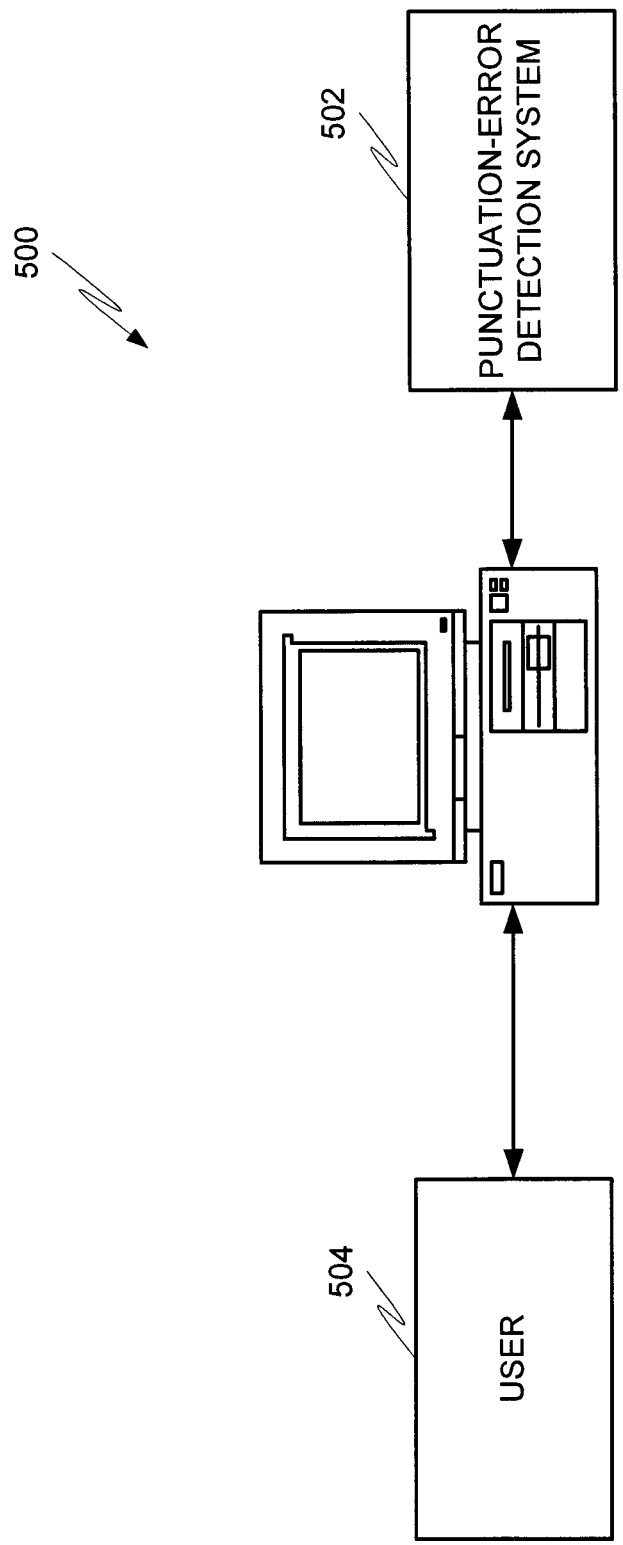
FIG. 5 illustrates an example of a stand-alone computer hosting a punctuation-error detection system.

This written description uses examples to disclose the invention, including the best mode, and also to enable a person skilled in the art to make and use the invention. The patentable scope of the invention may include other examples. As an example, a computer-implemented system and method can be configured such that a punctuation-error detection system 502 can be provided on a stand-alone computer for access by a user, such as shown at 500 in FIG. 5. For example, the systems and methods may include data signals conveyed via networks (e.g., local area network, wide area network, interne, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It may be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of detecting punctuation errors in a text including one or more sentences, the method comprising:

receiving a sentence in a text including one or more preexisting punctuation marks;

determining one or more punctuation marks that should be included in the sentence with a processing system;

comparing using the processing system, the determined punctuation marks with the preexisting punctuation marks;

identifying using the processing system, a punctuation mark that should be inserted into a space between two words in the sentence based on said step of comparing, the space in the sentence not being punctuated by any of the preexisting punctuation marks;

outputting a report of punctuation errors based on the comparison; and displaying a corrected form of the sentence from the text that depicts the sentence with the one or more punctuation marks determined that should be included in the sentence;

wherein said determining one or more punctuation marks that should be included in the sentence with the processing system includes:

identifying a target insertion point for a punctuation mark in the text;

identifying a predetermined number of words surrounding the target insertion point;

parsing the identified words into a plurality of n-grams;

converting the plurality of n-grams into a corresponding plurality of part-of-speech n-grams;

generating a combination unigram for each of the identified words, the combination unigram including the associated identified word and the part-of-speech of the associated identified word; and applying a statistical classifier using at least the plurality of n-grams, the plurality of part-of-speech n-grams, and the combination unigrams, the statistical classifier determining the one or more punctuation marks that should be included in the sentence.

2. The method of claim 1, wherein determining one or more punctuation marks that should be included in the sentence includes:
   determining whether a punctuation mark is needed for a space between two words in the sentence.

3. The method of claim 1, further comprising:
   correcting punctuation errors in the sentence based on the report of punctuation errors.

4. The method of claim 1, wherein the one or more punctuation marks that should be included in the sentence are determined regardless of the preexisting punctuation marks.

5. The method of claim 1, wherein the preexisting punctuation marks include commas.

6. The method of claim 1, wherein the statistical classifier includes a conditional-random-fields classifier.

7. The method of claim 1, wherein generating the statistical classifier includes using a first combination feature, the first combination feature including a first word appearing in an introductory phrase in the sentence and the first word's part-of-speech.

8. The method of claim 1, wherein generating the statistical classifier includes using one or more distance features.

9. The method of claim 8, wherein the distance features include a distance between the target insertion point and a beginning of the sentence and a second distance between the target insertion point and an end of the sentence.

10. The method of claim 8, wherein the distance features include a distance between the target insertion point and a previous coordinating conjunction and a second distance between the target insertion point and a subsequent coordinating conjunction.

11. A system of detecting punctuation errors in a text including one or more sentences, the system comprising:
   one or more data processors;
   one or more computer-readable mediums in communication with the data processors encoded with instructions for commanding the data processors to execute steps comprising:
      receiving a sentence including one or more preexisting punctuation marks;
      determining one or more punctuation marks that should be included in the sentence;
      comparing the determined punctuation marks with the preexisting punctuation marks;
      identifying a punctuation mark that should be inserted into a space between two words in the sentence based on said step of comparing, the space in the sentence not being punctuated by any of the preexisting punctuation marks;
      outputting a report of punctuation errors based on the comparison; and
      displaying a corrected form of the sentence that depicts the sentence with the one or more punctuation marks determined that should be included in the sentence;
      wherein said determining one or more punctuation marks that should be included in the sentence includes:
         identifying a target insertion point for a punctuation mark in the text;
         identifying a predetermined number of words surrounding the target insertion point;
         parsing the identified words into a plurality of n-grams;
         converting the plurality of n-grams into a corresponding plurality of part-of-speech n-grams;
         generating a combination unigram for each of the identified words, the combination unigram including the associated identified word and the part-of-speech of the associated identified word; and
      applying a statistical classifier using at least the plurality of n-grams, the plurality of part-of-speech n-grams, and the combination unigrams, the statistical classifier determining the one or more punctuation marks that should be included in the sentence.

12. The system of claim 11, wherein determining one or more punctuation marks that should be included in the sentence includes:
   determining whether a punctuation mark is needed for a space between two of the plurality of words in the sentence.

13. The system of claim 11, wherein the instructions are adapted to command the data processors to perform further steps comprising:
   correcting punctuation errors in the sentence based on the report of punctuation errors.

14. The system of claim 11, wherein the one or more punctuation marks that should be included in the sentence are determined regardless of the preexisting punctuation marks.

15. The system of claim 11, wherein the preexisting punctuation marks include commas.

16. The system of claim 11, wherein the statistical classifier includes a conditional-random-fields classifier.

17. The system of claim 11, wherein generating the statistical classifier includes using a first combination feature, the first combination feature including a first word appearing in an introductory phrase in the sentence and the first word's part-of-speech.

18. The system of claim 11, wherein generating the statistical classifier includes using one or more distance features.

19. The system of claim 18, wherein the distance features include a distance between the target insertion point and a beginning of the sentence and a second distance between the target insertion point and an end of the sentence.

20. A non-transitory computer-readable storage medium for detecting punctuation errors in a text including one or more sentences, said storage medium including programming instructions for causing a processing system to perform steps comprising:
   receiving a sentence including one or more preexisting punctuation marks;
   determining one or more punctuation marks that should be included in the sentence;
   comparing the determined punctuation marks with the preexisting punctuation marks;
   identifying a punctuation mark that should be inserted into a space between two words in the sentence based on said step of comparing, the space in the sentence not being punctuated by any of the preexisting punctuation marks;
   outputting a report of punctuation errors based on the comparison; and
   displaying a corrected form of the sentence that depicts the sentence with the one or more punctuation marks determined that should be included in the sentence;
   wherein said determining of the one or more punctuation marks includes:
      identifying a target insertion point for a punctuation mark in the text;
      identifying a predetermined number of words surrounding the target insertion point;
      parsing the identified words into a plurality of n-grams;
      converting the plurality of n-grams into a corresponding plurality of part-of-speech n-grams;

generating a combination unigram for each of the identified words, the combination unigram including the associated identified word and the part-of-speech of the associated identified word; and applying a statistical classifier using at least the plurality of n-grams, the plurality of part-of-speech n-grams, and the combination unigrams, the statistical classifier determining the one or more punctuation marks that should be included in the sentence.

\* \* \* \* \*